Jan. 30, 1962  J. DECKER  3,019,066
MACHINE TOOL SPINDLE CONSTRUCTION
Filed March 23, 1959
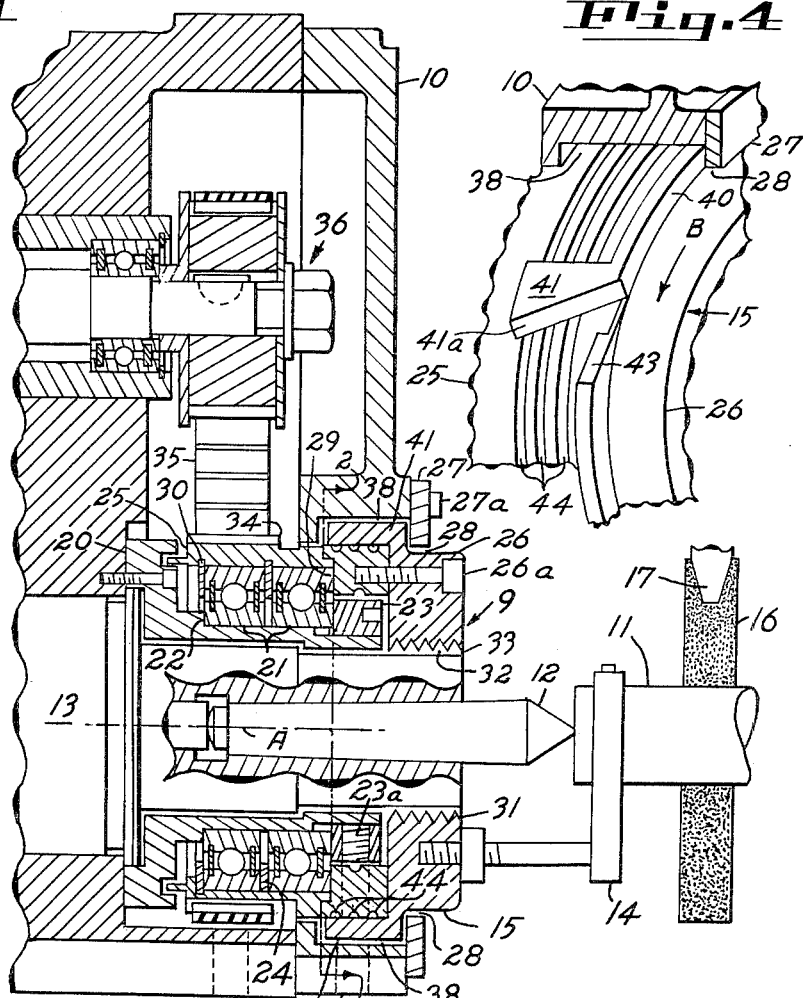
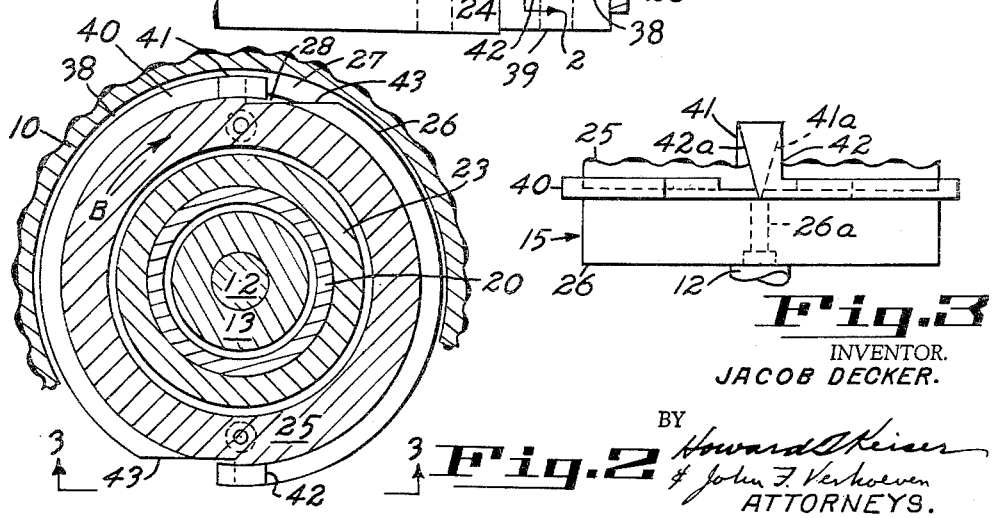
INVENTOR.
JACOB DECKER.
BY
Howard O. Keiser
& John F. Verhoeven
ATTORNEYS.

United States Patent Office 3,019,066
Patented Jan. 30, 1962

3,019,066
MACHINE TOOL SPINDLE CONSTRUCTION
Jacob Decker, Cincinnati, Ohio, assignor to The Cincinnati Milling Machine Co., Cincinnati, Ohio, a corporation of Ohio
Filed Mar. 23, 1959, Ser. No. 801,353
1 Claim. (Cl. 308—187.1)

The present invention relates to an improved machine tool spindle construction particularly effective in preventing foreign matter from settling therein.

When an operation is performed on a workpiece in a machine tool, such as a grinding machine, particles of the cutting element and/or the workpiece dislodged as a result of the operation form grit which works its way into housings for adjacent rotating mechanisms, such as, for example, the spindle which drives the workpiece. It is evident that this abrasive grit can seriously affect the rotating mechanism, particularly if it penetrates the bearings. This grit, when mixed with cutting fluid spray can form a sludge which settles in the mechanism and eventually impairs its operability. Generally, if drainage passages are provided, they soon become clogged and ineffective to remove the accumulating sludge.

In the present invention an improved spindle construction is provided in which foreign matter, such as sludge or grit, is prevented from settling in the spindle structure. At least one blade having an inclined face is provided to rotate inside the spindle housing adjacent the opening in the housing through which the spindle extends. The blade, by virtue of the incline on its face, repels much of the foreign matter introduced through the opening back out through said opening. In the preferred form of the invention a rotating member of the spindle carries the blade, or blades, and an annular trough, connected at the bottom to a drainage passage, is provided in the housing to encircle said rotating spindle member and collect grit entering through the opening. Although troughs have been used before to collect grit, in the present invention the trough is positioned so the blades extend into the trough and rotate therein. Foreign matter which, despite the initial repelling action of the blades, collects in the trough is continuously agitated by the blade or blades. The agitated foreign matter is either driven out through the opening or, at least, is kept from settling in the trough. The agitation by the blades promotes movement, or flow, of the foreign matter along the trough and into the drainage passage and prevents accumulation of sludge, or caking thereof, in the trough. Blockage of the drain passage is thereby prevented and the effectiveness of the trough to collect foreign matter is not impaired by settled sludge. The blades and trough, which are located between the opening and the spindle bearings, effectively prevent foreign matter from reaching the bearings, and the foreign matter is repelled or discharged from the spindle mechanism before any significant damage can be done thereby.

It is therefore an object of the present invention to repel foreign matter from housings adjacent the cutting operation in a machine tool.

It is another object of the present invention to repel foreign matter entering a housing opening back through said opening.

It is another object of the present invention to agitate foreign matter collected in a housing to promote the flow thereof away from the mechanism therein.

It is yet another object of the present invention to provide a simple, effective mechanism to prevent the accumulation of foreign matter in a machine tool mechanism.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claim, without departing from or exceeding the spirit of the invention.

In the drawings:
FIG. 1 is a cross-sectional view of the spindle construction of the present invention;
FIG. 2 is a view taken on the line 2—2 of FIG. 1;
FIG. 3 is a view taken on the line 3—3 of FIG. 2;
FIG. 4 is a view in perspective showing a blade on the rotating member and the trough, broken away, in which it rotates.

The spindle 9 of the present invention is mounted in a housing 10, which may, for example, be the headstock housing of a grinding machine mounted on the reciprocating table thereof as, for example, shown in U.S. Patent 2,641,876. The spindle 9 as shown includes a stationary portion and a rotating portion but the present invention may as well be incorporated in any rotating spindle or member. The stationary portion of the spindle shown, spindle member 13, has a center 12 which supports one end of a workpiece 11, the other end of which may also be supported by a center (not shown). The rotating portion of the spindle, spindle member 15, drives the workpiece through a dog 14, clamped thereto, for grinding by the grinding wheel 16 rotatably mounted in a wheelhead (not shown). Fluid coolant is directed through nozzle 17 onto the workpiece 11 and wheel 16.

The housing 10 includes a sleeve 20 through which the stationary spindle member 13, supported by other portions of the housing 10, extends. The member 13 has a central longitudinal horizontal axis A in which the center 12, received in the spindle member 13, lies. The sleeve 20 receives annular anti-friction bearings 21 between shoulder 22 of the sleeve and collar 23 clamped on the sleeve by screw 23a, the bearings being held in spaced relation by annular spacer ring 24. The rotating member 15 comprises an annular rear skirt portion 25 received over the bearings and carried thereby, and a forward portion 26 connected to the skirt portion 25 by bolts 26a. A ring 27 connected on the forward face of the housing 10 by bolts 27a, and forming a part of the housing, defines a circular opening in the face of the housing 10 on axis A through which the forward portion 26 of the rotating member 15 extends. A circular gap 28 is formed between the ring 27 and the portion 26 of the rotating member 15. The rotating member 15 is held in proper axial position on the bearings by shoulder 29 in the skirt portion and locking ring 30 engaged with that portion, between which the bearings 21 are sandwiched. The axis A also defines the central axis of sleeve 20 so that the member 15 rotates about that axis. The forward portion 26 of the rotating member has a threaded opening 31 into which the stationary spindle member 13 extends. The threads 32 of opening 31 are radially spaced from member 13 and a circular gap 33 is defined therebetween.

The skirt portion 25 of rotating member 15 has external circumferentially spaced teeth 34 which receive a belt 35 driven through the rotating drive mechanism shown generally at 36 to rotate the spindle member 15 about the axis A.

The housing 10, including the ring 27 on the forward face thereof, defines an annular trough 38 encircling the rotating member about axis A, radially outward therefrom and concentric therewith. A drainage passage 39 through the housing 10 is in communication with the trough 38 at the bottom thereof.

The forward portion 26 of the rotating member 15 has an annular upstanding rib 40, from which a blade 41 tends rearwardly. Another blade 42 is carried by the rotating spindle member 15 opposite blade 41. The blades have faces 41a and 42a, defining the leading edges of the blades and sloping in the direction of rotation of member 15, indicated by arrows B, as they extend rearwardly from the rib 40. The rib 40 is cut away at 43 in the direction of rotation from blades 41 and 42. The rib 40 and blades 41 and 42 extend into the trough 38 for rotation therein.

Foreign matter entering gap 28 is blocked by rib 40 but since there must necessarily be clearance between the rotating rib and the stationary ring 27 constituting one wall of the trough 38, the trough will be in communication with the gap 28 and foreign matter will work its way around the rib and into the trough. Grooves 44 in the surface of skirt portion 25 check the progress of the foreign matter across rotating member 15 and matter collecting in said grooves is thrown into the trough. Foreign matter entering gap 28, and foreign matter agitated in the trough 38 by the blades, is contacted by faces 41a and 42a and driven forwardly through the cuts 43 in the rib back out gap 28. The agitated foreign matter not so repelled flows, or moves, down the trough and out through drain passage 39. Thus the blades prevent grit and sludge from collecting, or caking, in the trough to block the drainage passage. The trough is kept substantially free of foreign matter and its effectiveness in collecting grit and sludge introduced into the housing is not impaired.

Foreign matter entering gap 33 is carried back out by the action of the threads rotating in the direction indicated by arrows B but the construction at this opening forms no part of present invention.

What is claimed is:

In a machine tool having a housing and a bearing therein, said housing having an opening in registration with the bearing, the combination of a spindle having at least a portion thereof mounted for rotation in the bearing, the rotatable portion of the spindle extending forwardly out through said opening to define an annular gap between said spindle portion and the housing, means to rotate said spindle portion in a predetermined direction, means defining an annular trough inside the housing between the housing opening and the bearing having a base and walls extending radially inwardly from the base, one of said walls adjacent the housing opening and terminating at the annular gap, said trough encircling the rotatable portion of the spindle to collect solid foreign matter introduced through the gap and prevent the same from reaching the bearing, means in the housing defining a drain passage connected to the base of the trough at the bottom thereof, an annular rib on the rotatable portion of the spindle extending into the trough close to said one wall thereof to impede the entry of foreign matter through said gap, and a blade on the rotatable portion of the spindle behind the rib extending rearwardly therefrom in the trough to agitate foreign matter settled therein, said blade having a face sloping in said predetermined direction as it extends rearwardly from the rib to repel foreign matter entering the housing through the gap when said spindle portion is rotated in said predetermined direction, said rib having a cut adjacent the sloping face of the blade to pass foreign matter repelled by the blade.

References Cited in the file of this patent

UNITED STATES PATENTS

| | | |
|---|---|---|
| 1,163,045 | Symons | Dec. 7, 1915 |
| 1,463,018 | Junggren | July 24, 1923 |
| 2,306,724 | Gouldthorpe | Dec. 29, 1942 |
| 2,541,645 | Fasoli | Feb. 13, 1951 |